United States Patent
Varghese et al.

(10) Patent No.: US 12,093,506 B2
(45) Date of Patent: Sep. 17, 2024

(54) SYSTEMS AND METHODS FOR A TOUCHSCREEN USER INTERFACE FOR A COLLABORATIVE EDITING TOOL

(71) Applicant: Google LLC, Mountain View, CA (US)

(72) Inventors: Sujit Varghese, New York, NY (US); Barine Tee, East Stroudsburg, PA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/705,739

(22) Filed: Mar. 28, 2022

(65) Prior Publication Data

US 2022/0214784 A1 Jul. 7, 2022

Related U.S. Application Data (63) Continuation of application No. 15/267,303, filed on Sep. 16, 2016, now Pat. No. 11,287,951.

(51) Int. Cl.
*G06F 3/0482* (2013.01)
*G06F 3/04817* (2022.01)
(Continued)

(52) U.S. Cl.
CPC ........ *G06F 3/0482* (2013.01); *G06F 3/04817* (2013.01); *G06F 3/0488* (2013.01);
(Continued)

(58) Field of Classification Search
CPC .. G06F 3/0482; G06F 3/04817; G06F 3/0488; G06F 3/04883; G06F 3/04886; G06F 40/166
See application file for complete search history.

(56) References Cited

U.S. PATENT DOCUMENTS

| 5,119,079 A | 6/1992 | Hube et al. |
| 2003/0088793 A1 | 5/2003 | Parry |

(Continued)

FOREIGN PATENT DOCUMENTS

| CN | 101561826 A | 10/2009 |
| CN | 102929533 A | 2/2013 |

(Continued)

OTHER PUBLICATIONS

International Search Report for application PCT/US2017/054441 dated Jan. 26, 2018, 23 pages.

(Continued)

*Primary Examiner* — Daniel Samwel
(74) *Attorney, Agent, or Firm* — Lowenstein Sandler LLP (57) ABSTRACT

Technology for a touchscreen device that enhances the presentation of menus. In one example, the technology may involve presenting a menu icon at a location on the touchscreen device; detecting, by a processor, a size of a touch of the touchscreen device; selecting, based on the size of the touch, additional menu icons from a set of menu icons comprising different menu options; presenting, by the processor, the additional menu icons as a group adjacent to the location of the menu icon; detecting, by the processor, a touch of one of the additional menu icons; presenting expanded menu options of the touched additional menu icon adjacent to the touched additional menu icon; and performing a function corresponding to at least one of the expanded menu options.

19 Claims, 9 Drawing Sheets

(51) Int. Cl.
  *G06F 3/0488* (2022.01)
  *G06F 3/04883* (2022.01)
  *G06F 3/04886* (2022.01)
  *G06F 40/166* (2020.01)

(52) U.S. Cl.
  CPC ...... *G06F 3/04883* (2013.01); *G06F 3/04886* (2013.01); *G06F 40/166* (2020.01)

(56) References Cited

U.S. PATENT DOCUMENTS

| | | | |
|---|---|---|---|
| 2004/0135805 A1* | 7/2004 | Gottsacker | G06F 40/103 715/751 |
| 2007/0008300 A1 | 1/2007 | Yang et al. | |
| 2007/0094597 A1* | 4/2007 | Rostom | G06F 9/452 715/700 |
| 2008/0163053 A1* | 7/2008 | Hwang | G06F 3/0482 715/702 |
| 2008/0172633 A1 | 7/2008 | Jeon et al. | |
| 2009/0109187 A1 | 4/2009 | Noma | |
| 2010/0265185 A1 | 10/2010 | Oksanen | |
| 2010/0283744 A1 | 11/2010 | Nordenhake et al. | |
| 2011/0119624 A1 | 5/2011 | Coldefy et al. | |
| 2012/0030563 A1 | 5/2012 | Cardno et al. | |
| 2012/0105453 A1 | 5/2012 | Cardno et al. | |
| 2012/0144345 A1 | 6/2012 | Munter et al. | |
| 2012/0226978 A1* | 9/2012 | Harberts | G06F 3/0485 715/702 |
| 2012/0272144 A1 | 10/2012 | Radakovitz et al. | |
| 2012/0299860 A1 | 11/2012 | Wang et al. | |
| 2013/0019175 A1 | 1/2013 | Kotler et al. | |
| 2013/0219340 A1 | 8/2013 | Linge | |
| 2014/0298264 A1 | 10/2014 | Pearce | |
| 2015/0186348 A1 | 7/2015 | Hicks et al. | |
| 2015/0268802 A1 | 9/2015 | Kim et al. | |
| 2015/0324070 A1* | 11/2015 | Kim | G06F 3/0416 715/825 |
| 2015/0341399 A1* | 11/2015 | Lee | H04L 65/403 715/255 |
| 2017/0060315 A1* | 3/2017 | Park | G06F 3/0482 |
| 2019/0196673 A1* | 6/2019 | Bashev | G06F 3/0481 |

FOREIGN PATENT DOCUMENTS

| | | |
|---|---|---|
| CN | 102968267 A | 3/2013 |
| CN | 103092521 A | 5/2013 |
| CN | 103257823 A | 8/2013 |
| CN | 103282869 A | 9/2013 |
| CN | 103631484 A | 3/2014 |
| EP | 2602702 A2 | 6/2013 |
| EP | 2631774 A1 | 8/2013 |
| EP | 2813939 A1 | 12/2014 |

OTHER PUBLICATIONS

International Search Report and Written Opinion for International Application No. PCT/US2017/051316, mailed Jan. 26, 2018, 19 pages.
Office Action for Chinese Patent Application No. 202210688417.6, mailed Mar. 6, 2024, 23 Pages.
Notice of Allowance for Chinese Patent Application No. 202210688417.6, mailed Jul. 8, 2024, 06 Pages.

* cited by examiner

FIG. 9 system for a touchscreen user interface for a collaborative editing tool

RELATED APPLICATIONS

The present application is a continuation of application Ser. No. 15/267,303, filed Sep. 16, 2016, entitled "SYSTEMS AND METHODS FOR A TOUCHSCREEN USER INTERFACE FOR A COLLABORATIVE EDITING TOOL" which is incorporated by reference herein.

FIELD OF THE INVENTION

In general, this disclosure relates to an electronic document editor used on a touchscreen device.

BACKGROUND

Collaborative editing tools allow computer device users to edit documents with other users. Such tools allow multiple users to access electronic documents from a computer or remote device and edit the documents on the device. The user can interact with the document using a keyboard and mouse connected to the computer. As portable devices and tablets become more commonplace, users wishing to edit collaborative documents may be limited by input options of keyboard and mouse input devices that are appropriate for stationary devices like desktop computers but not for the portable devices with small screens. Adapting these input options to touch input remains a significant challenge for portable devices.

SUMMARY

Systems and methods are disclosed herein for a touchscreen device based collaborative editing or productivity tool that allows a user to add content and media to a collaborative document.

Systems and methods are provided for accepting user commands on a touchscreen device, including presenting a menu icon on the touchscreen device, receiving, by a processor, a first signal generated by a touch, by a first user, of the menu icon, in response to the first signal generated by the touch of the menu icon, providing a first grouping of additional menu icons, representing functions to be performed, receiving, by the processor, a second signal generated by a touch, by the first user, of one of the additional menu icons; in response to the second signal generated by the touch of the one of the additional menu icons, performing a function selected from the group consisting of loading and displaying a document, executing a user program, and displaying further menu icons on the touchscreen device.

In some implementations, the persistent menu icon is smaller than the first grouping of additional menu icons. In other scenarios, the persistent menu icon may be hidden when no interactions are sensed by the touchscreen device and revealed again when any interactions are sensed by the touchscreen device. The menu icons grouped adjacent to the one of the additional menu icons may be related to the one of the additional menu icons that was touched causing the second signal. The menu icons grouped adjacent to the one of the additional menu icons may be displayed based on a selection type of the user. The document can be a collaborative document that is used and shared with multiple users. In another implementation, a third signal may be received from a second user of the collaborative document, and in response to the third signal, presenting a menu icon to the second user that is different from a respective menu icon view of the first user in the collaborative document. The document display and the menu displays to the second user may be based on an access control list for the document.

Accordingly, a system is described that improves creation of and editing ability for collaborative documents on a touchscreen device by detecting user interactions and user contact types, and presenting intuitive document editing features that are significantly more convenient for use with small portable devices than conventional creation and editing features adapted for keyboard and mouse input devices. The document editing features are provided using a menu that is presented in various ways depending on a user's interactions with the system. This menu replaces conventional menu bar and toolbar features that were intended for a mouse, and instead provides an on-call menu system that is convenient for touch input and allows to keep the screen area clean and simple like a piece of paper, allowing users to think and express information freely similarly to the way they imagine it in their heads.

In another example, a method for editing an electronic document using a collaborative document interface for a touchscreen device includes receiving, by a processor, an edit of an electronic document in a collaborative document editing interface; determining a size of a contact point of an input used for the edit; and applying the edit to the electronic document based on the size of the contact point. A relatively small sized contact point input is applied as a stylus entry. A relatively large sized contact point input is applied as an erasure.

Accordingly, the document editing features are provided that offer automated assistance with drawing shapes and objects without the need of additional object selections and menu systems.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the disclosure, certain illustrative embodiments will now be described, including a system for collaboratively creating documents using touchscreen devices. In particular, a system is described that improves creation of and editing ability for collaborative documents on a touchscreen device by detecting user interactions and user contact types, and presenting intuitive document editing features. In some implementations, the document editing features are provided using a menu that is presented in various ways depending on a user's interactions with the system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more touchscreen devices, which include a processing device or devices, such as a computer, microprocessor, logic device or other device or processor that is configured with hardware, firmware, and software to carry out one or more of the computerized methods described herein.

The present disclosure provides systems and methods for a productivity tool that is used to create and edit collaborative documents. The collaborative documents may take a free form canvas style without the strict framework or structures of commonly used documents, such as spreadsheets, word processors, or presentations, however, features of such documents may be provided in the document. The systems and method described herein may be implemented using a touchscreen device such as a tablet, smartphone, smart board, or other device having a touchscreen. Since such devices typically do not include all of the peripheral input devices of a personal computer, such as a mouse pointer and keyboard, user interactions with the touchscreen are detected and interpreted by the system to present intuitive document editing features in part by providing persistent menus and changeable feature menus. In addition, the creation and editing of documents is facilitated by providing a way to integrate content from a variety of sources as well as accessing and storing such content.

Figure 1:
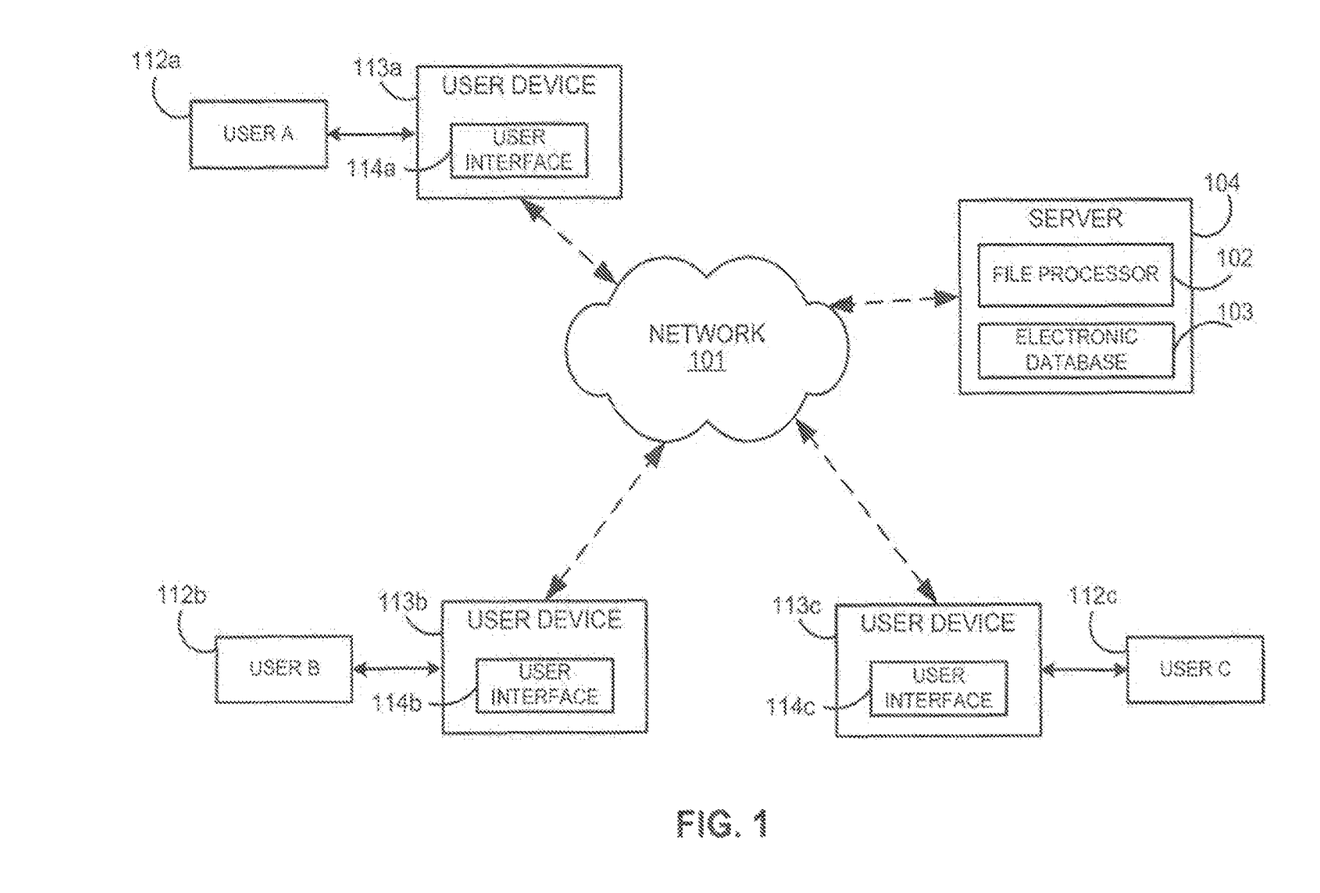
FIG. 1 is a block diagram of a computerized system for a collaborative document editing tool, according to an illustrative embodiment.

FIG. 1 depicts an example of a network and database structure that may be used to implement the systems and methods herein. FIG. 1 is a block diagram of a computerized system 100 for providing a touchscreen productivity tool. The system 100 includes a server 104 and three user devices 113a-113c (generally, user device 113) connected over a network 101. The server 104 includes a file processor 102 and an electronic database 103. The file processor 102 runs the productivity tool and manages updates to a document that is stored in the electronic database 103. Each user device 113 includes a user interface 114a-114c (generally, user interface 114), each of which may include a display with a touchscreen capable of sensing user inputs by touch. Users 112a-112c (generally user 112) interact with the user devices 113 over the user interfaces 114 to view documents maintained by the server 104 and provide changes to the documents. Additionally, one or more processors may be in each user device 113, the server 104, and the file processor 102. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one server 104 and three user devices 113 are shown in FIG. 1 to avoid complicating the drawing. In general, the system 100 can support multiple servers and any number of user devices.

The server 104 may be a web-based storage system, for example, a cloud storage system, that hosts files and allows users to store, retrieve, and modify data. This data may be referred to as a user's web data, which may be stored in a portion of the electronic database 103 that is allocated to each user. The server 104, the file processor 102, or both may perform functions related to maintaining the documents that are stored on the electronic database 103. The server 104 may be implemented on a single server system or in a distributed system. In particular, the server 104 may use cloud storage to store user data.

The file processor 102 may include a processor and a memory unit that stores instructions readable by the processor to carry out any of the processes described herein. As shown in FIG. 1, the file processor 102 is a component on the server 104. However, any of the functions described herein as being implemented by the file processor 102 may be performed by any processor on the server 104, by a processor on any of the user devices 113, by a separate processor, or any suitable combination thereof. Moreover, the user devices 113 may include a memory unit that stores instructions readable by one or more processors to carry out the processes described herein.

In an example, a document is stored on the electronic database 103, and the users 112 simultaneously view and edit the document over the user devices 113. In particular, a view of the document is displayed on each of the user interfaces, and the users 112 may make changes to the document. The changes are transmitted over the network 101 to the server 104, which updates the document in the electronic database 103 with the changes, and transmits updated views of the document back to each of the user devices 113. In this manner, the view of the document is updated in real time with the changes that are made by each user.

Figure 2:
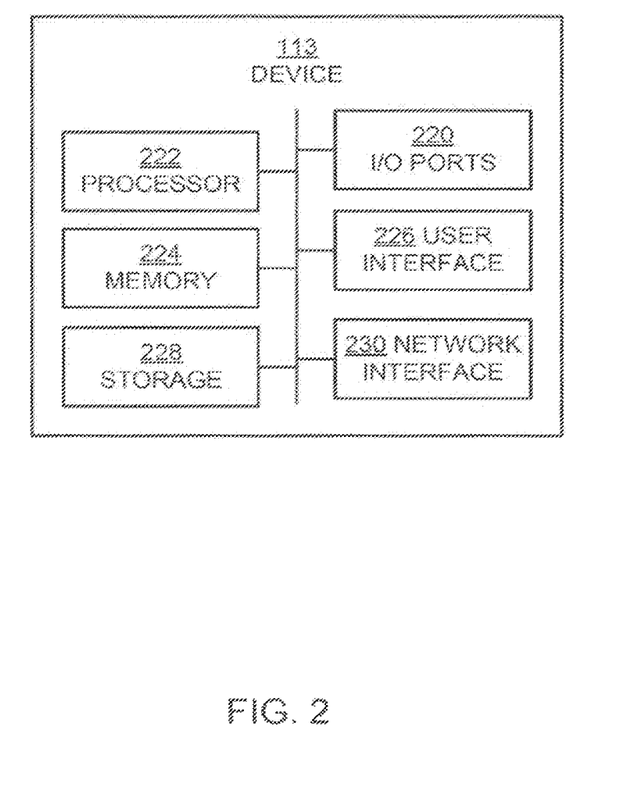
FIG. 2 is a block diagram of a user device, according to an illustrative embodiment.

FIG. 2 is a detailed block diagram of an exemplary user device 113. The user device 113 includes input/output (I/O) ports 220, a processor 222, a memory 224, a user interface 226, and a network interface 230, all connected over a data bus. The user at the user device 113 interacts with the user device 113 over the user interface 226, which includes a display unit, such as a touchscreen capable of receiving touches for user inputs. For example, the user interface 226 may include a screen with menu options that allow the user to select content creation and editing modes and directly enter content that can be stored on the user device memory 224 or at a database 103. The network interface 230 provides for communication between the user device 113 and the network 101, and files may be shared, stored, and processed via uploads over the network interface 230 to server 104. The I/O ports 220 may include ports for a user to connect an external device.

The processor 222 may be configured to perform any of the functions described herein as being performed by the user device 113. In an example, the processor 222 may communicate with the server 104 and the file processor 102 to for content creation. The memory 224 may store instructions readable by the processor 222 to carry out the processes described herein. In addition, the files that are to be uploaded to the server 104 may be temporarily stored in the memory 224.

The user device 113 in FIG. 2 is an illustrative example of a device that can be used to create content that may be collaborated and shared via a web-based storage system using server 104. In general, any user device that is connected to the network 101 may be used, such as a tablet, laptop, smart board and mobile devices. Generally speaking, the user device 113 is a touchscreen tablet or a smartboard.

Figure 3:
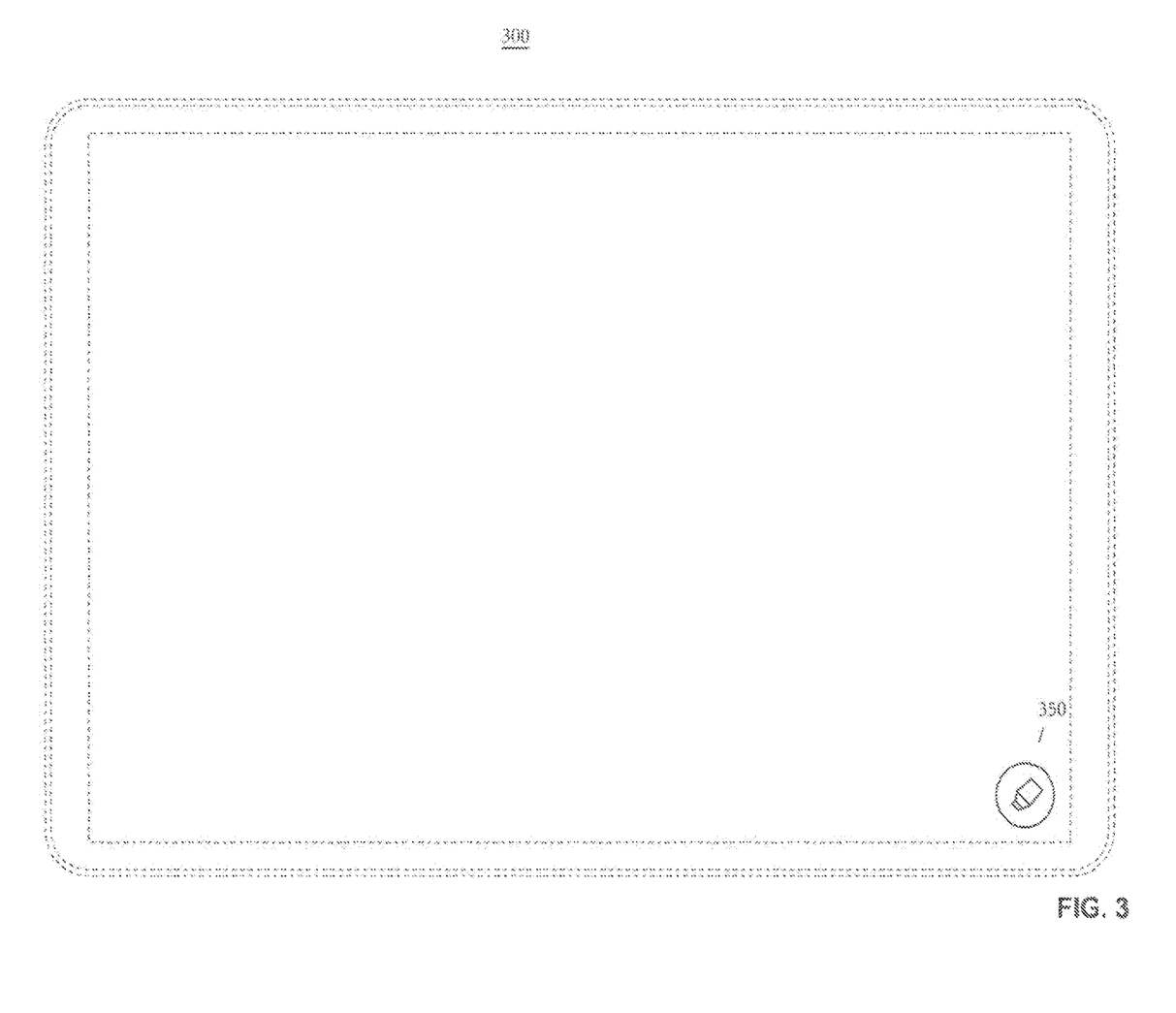
FIG. 3 is an exemplary user interface, according to an illustrative embodiment.

FIG. 3 depicts an exemplary user interface 300 for a productivity tool. As shown, user interface 300 may be provided on a user device, such as any user device 113. The user interface 300 may include a generally blank canvas with a menu button 350. The menu button 350 may be persistent and shown in the document at all times. The menu button 350 may also be located in a particular location of the screen. During creation of a document, the menu button 350 may move to another active location in the screen, for example, a location where the user has recently had an interaction with the document. In some scenarios, the menu button 350 is hidden and may be made visible by a user touching the screen. In other scenarios, the menu button 350 may be shown in a dimmed or shadow form so that the has a visual cue that the menu button 350 is available, but it does not interfere with the visual effect of the content in the document. The menu button 350 may be selected in several ways to obtain expanded menu buttons for a wide range of options for writing, drawing and creating content in the blank canvas. The user interactions may be by finger touches or by use of a stylus. The size of the contact point may be detected by the touchscreen interface and a relative size of the touch may be used as a basis by the user interface to provide one or more different editing options, as will be described herein. Detection of the contact point size may be accomplished by capturing contact information by the touchscreen and analyzing the contact information using a processor on the user device 113 or at the server 104.

Figure 4:
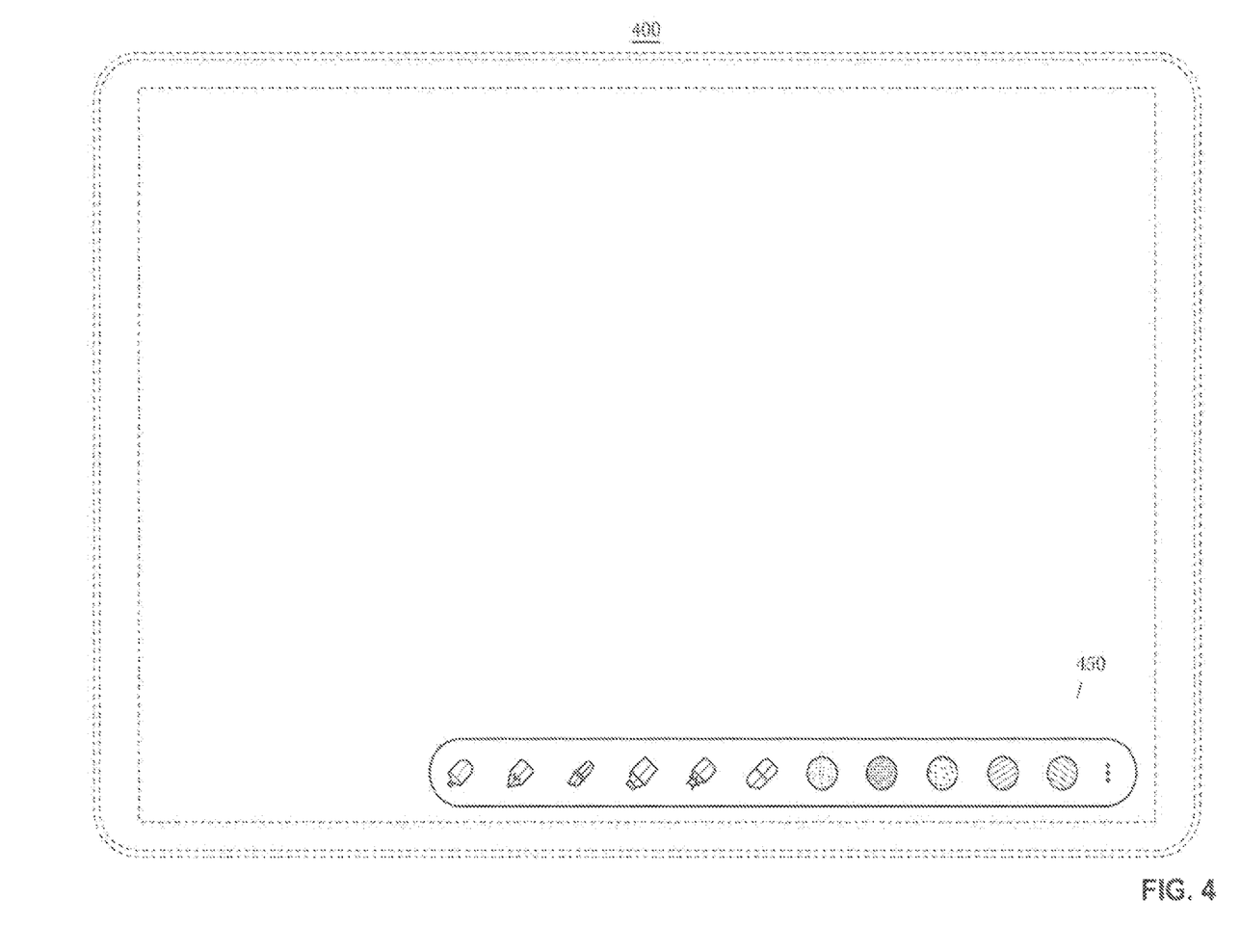
FIG. 4 is another exemplary user interface, according to an illustrative embodiment.

In one example, a user may interact with the menu button 350 by tapping or pressing the menu button to obtain a expanded menu button. As shown in FIG. 4, an expanded menu button 450 may be shown in user interface 400. The expanded menu button 450 may include different pen or paintbrush types, patterns, colors, or other writing and drawing implements for the user to select. Generally speaking, when a drawing or writing button is selected, additional drawing and writing options are provided in an adjacent menu.

Figure 5:
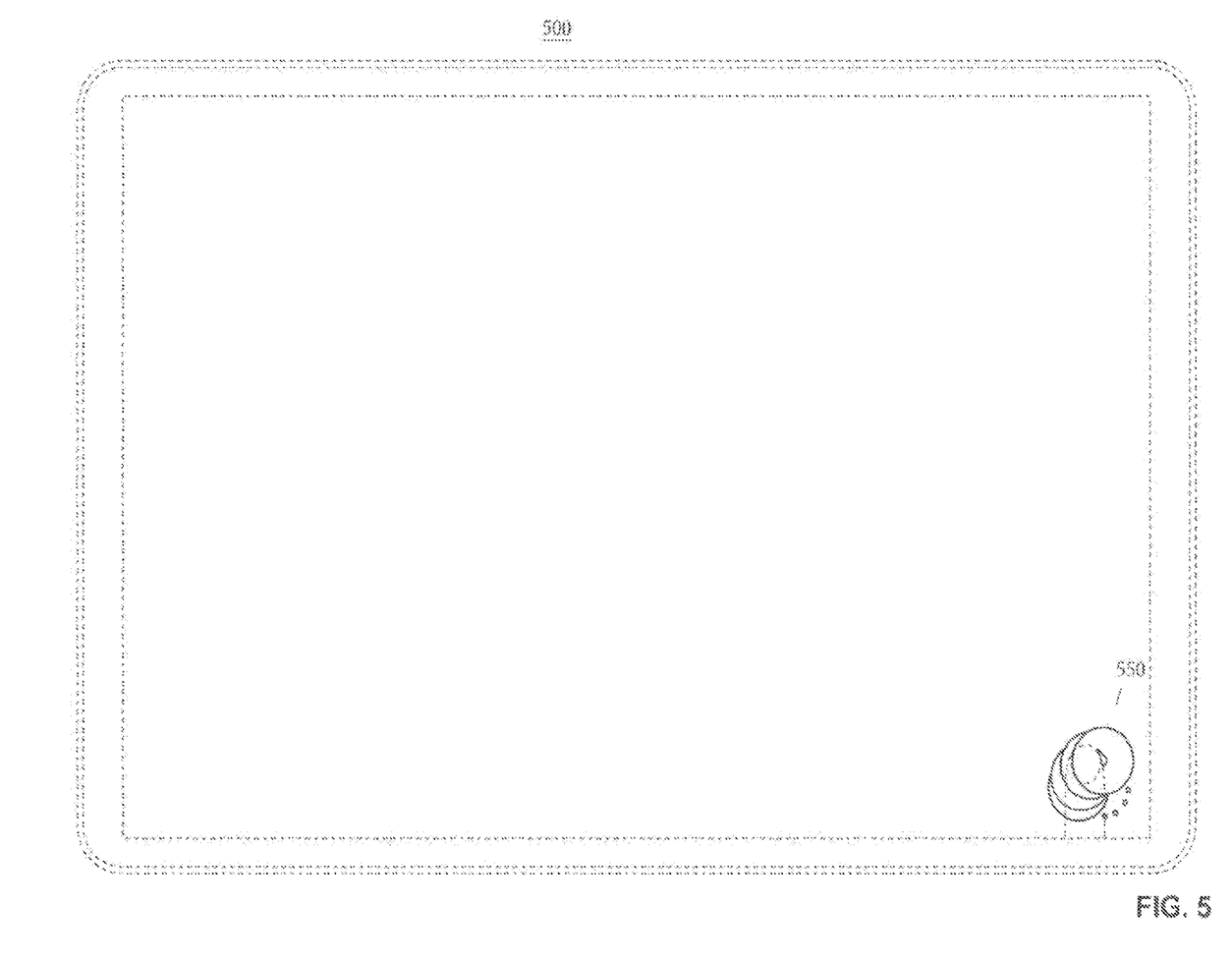
FIG. 5 is another exemplary user interface, according to an illustrative embodiment.
Figure 6:
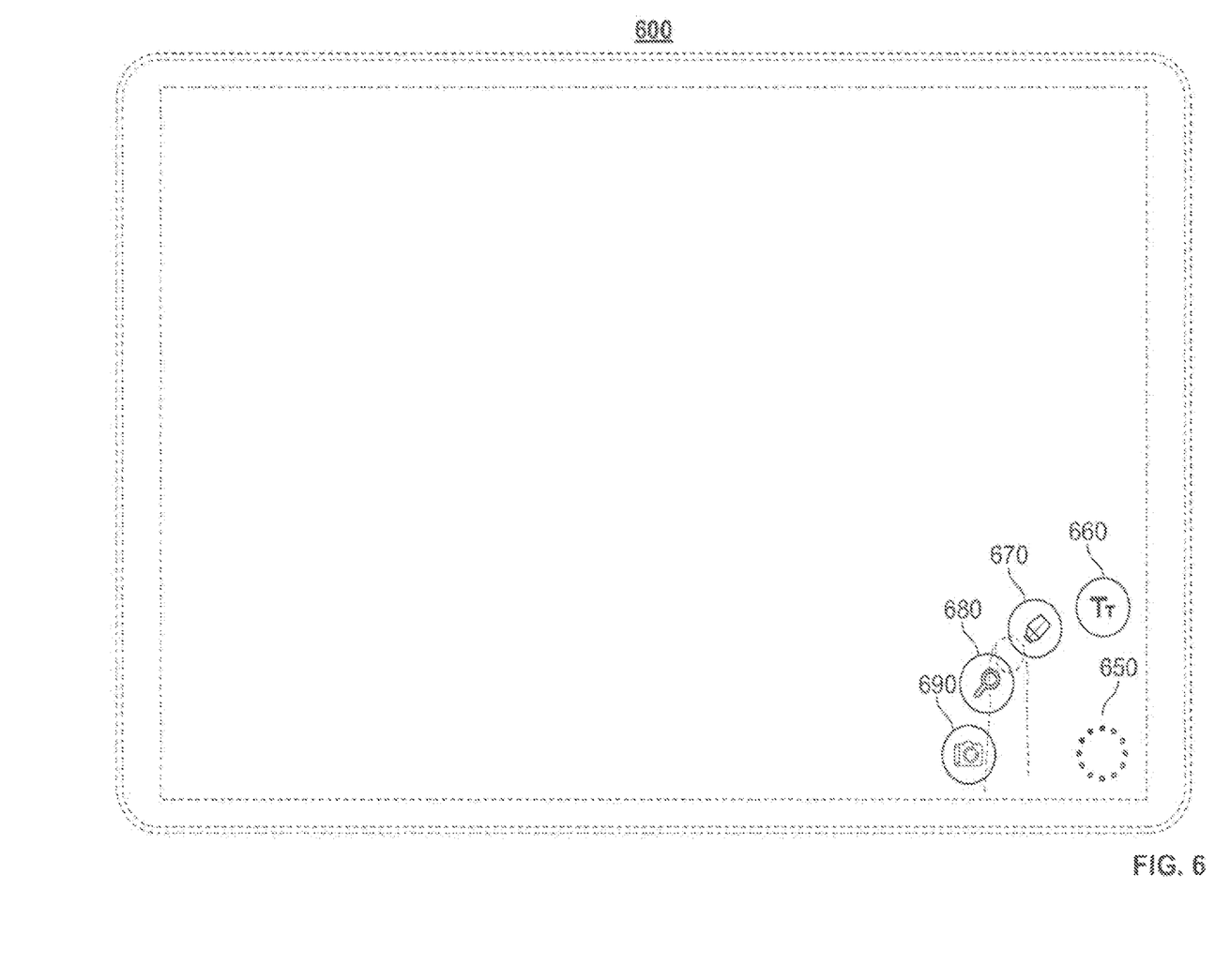
FIG. 6 is another exemplary user interface, according to an illustrative embodiment.

Another user interaction to the menu button 350 (FIG. 3) may be a rotating touch, or a long hold of the menu button 350. FIG. 5 shows another exemplary user interface 500 in which a menu button 550 may be rotated or dragged to obtain another expanded menu shown in FIG. 6. FIG. 6 depicts another exemplary user interface 600 for a touchscreen productivity tool. A shadow of a selected menu button 650, (for example, any menu button 350 or 550 that has been selected by a user) that has had a user interaction that causes an expanded menu of content creation options to appear. Generally speaking, the expanded menu options are related to the selected menu button. The shadow button 650 may include small dots, which indicate a number of options available for the user interface. As shown, a text option 660, a free hand drawing option 670, an internet search option 680, or a camera option 690 may be presented to the user. The text option 660 may be selected to allow text entry, for example, using a touchscreen keyboard or through freehand handwriting recognition. The free hand drawing option 670 may be selected to enter free hand drawing or freehand writing that is kept in its hand drawn or handwritten state. Internet search option 680 may be selected to perform an internet search, for example, using a search query window, which can receive search terms for searching. The results of the search may be incorporated into the document. The camera option 690 may be selected to start a camera session using a camera incorporated in the user device 113, or a photocopy feature to copy the visible screen of the user interface, or to choose an image from a file. Other content creation and editing options may also be provided.

Figure 7:
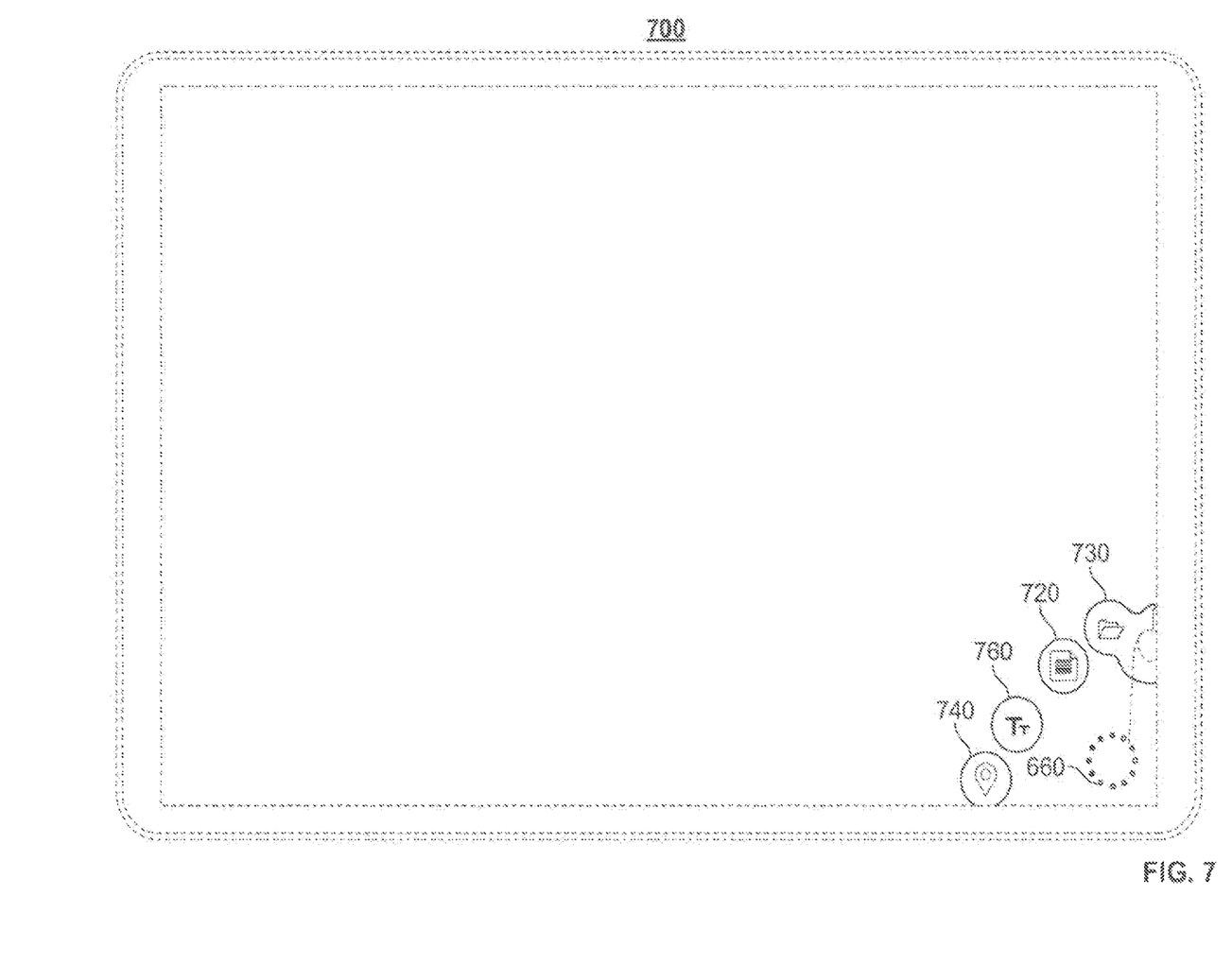
FIG. 7 is another exemplary user interface, according to an illustrative embodiment.

In FIG. 7, another exemplary user interface 700 is shown including additional creation and editing options, for example, a document processing application 720, a file storage manager application 730, a map application 740, and a text writer 760. The document processing application 720 may be selected to launch a document processing application which may run locally on the user device 113 or via a cloud service. The document processing application would execute within the environment of the productivity tool. The file storage manager application 730 may be selected to provide access to cloud or remote storage files which can be opened and accessed within the environment of the productivity tool. The map application 740 may be selected to obtain map information, for example, an internet or GPS based map application. And the text writer 760 may be selected to allow text entry, for example, using a touchscreen keyboard or through freehand handwriting recognition.

These and other content creation editing options may be viewed by the user by an interaction with the shadow button 750 that moves or rotates the shadow button 750. In another scenario, additional content creation and editing options may be obtained by holding one of the visible options, e.g., 730 and rotating it counterclockwise to view other options to the right, or rotating it clockwise to view other options that may lie to the left. In each of the user interfaces 300, 400, 500, 600 and 700 of FIGS. 3-7, different user interactions with menu buttons 350, 450, 550, 650 and 750 are detected by the touchscreen of the user device 113 and additional content creation options may be presented in the user interfaces (350, 450, 550, 650 and 750 of FIGS. 3-7). In addition, different types of touches and interactions in the user interfaces (350, 450, 550, 650 and 750 of FIGS. 3-7) can cause different actions for the blank canvas. For example, double tapping in a blank document can cause a new blank page to appear. In another example, double tapping could cause a deletion or an undo of a last input. In another example, a single finger press could cause an action, and a double finger press could cause another action. For a user using a finger to make selections, the effect of drawing with a paintbrush may be handled differently in the user interface than an effect of drawing with a paintbrush for a stylus user. For a user using both a stylus and finger touches, the user interface may treat the touches differently. For example, a stylus interaction touch may be interpreted to provide a fine or distinct line, whereas a double finger touch, or first rub, may indicate that a line or object should be erased.

Providing different responses to different touch types may be initially set by the productivity tool using intuitive actions. In addition, a user may specify certain actions and responses to touch types in a user setting. Such settings would be stored in association with user information on the user device 113 and/or at the server 104.

Figure 8:
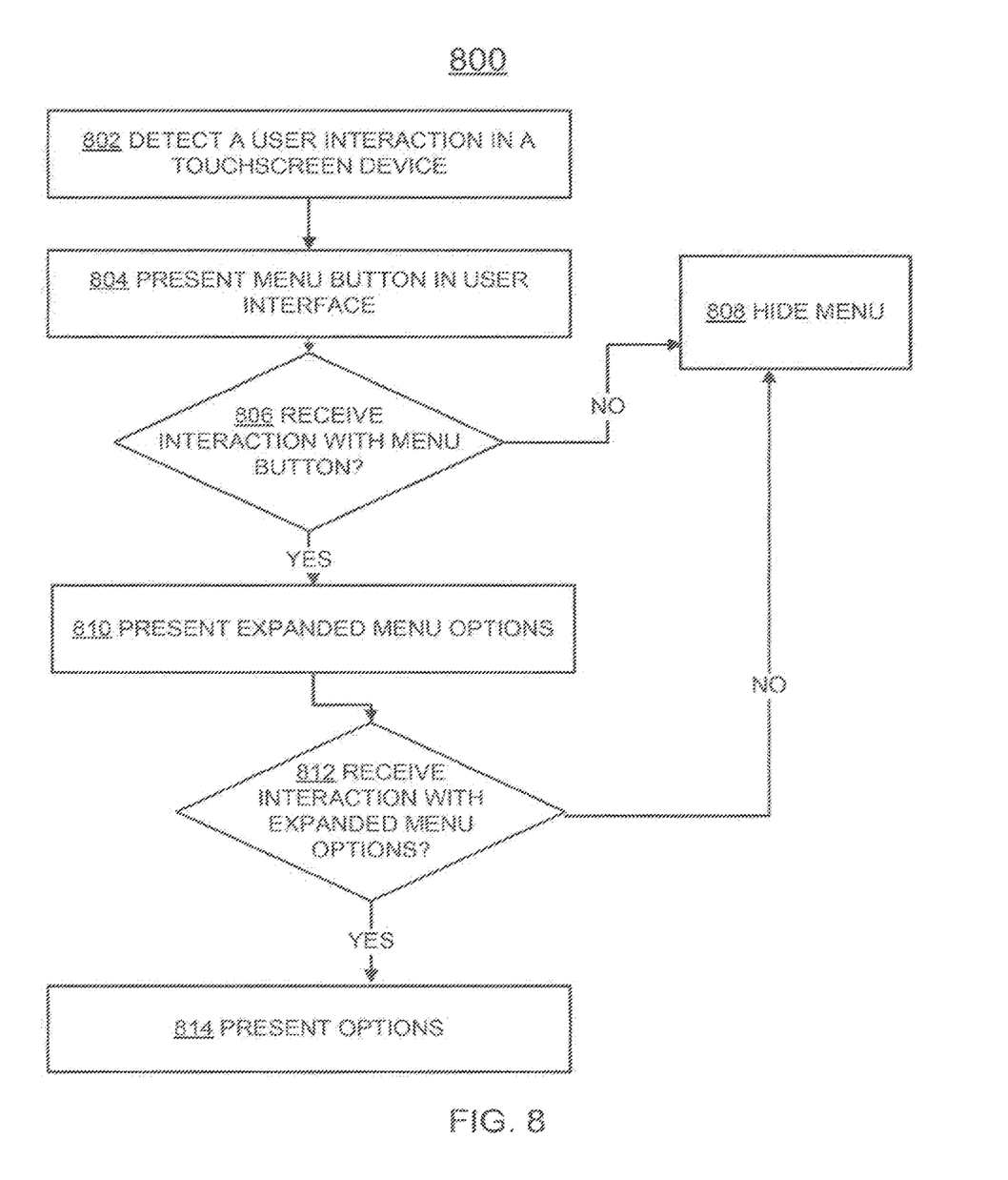
FIG. 8 is an exemplary flowchart of a method for presenting menu options, according to an illustrative embodiment.

Turning to FIG. 8, the menu operations may follow the flow chart 800. When a user initiates a document (or edits a document), the user may touch the touchscreen of the document. The user's touch is detected as a user interaction in a document 802, which may be interpreted by the processor as a touch signal. Upon receipt of the user's touch or other user interaction with the document, the productivity tool will present a menu button on the user interface 114 of the user device 113. In some scenarios, the menu button may be persistent in the user interface 114 and may be visible without the user interaction. When the menu button is visible, the user may interact with the menu button. Some examples of interactions include a tap, a long tap, a double tab, a long hold, a rotating, dragging or swiping movement. Any of such interactions may be detected by the touchscreen and communicated to the productivity tool to determine the type of interaction 806. In some uses, no interactions may be received and the menu button may disappear or be hidden from view 808. If an interaction with a menu button is received, expanded menu options will be presented at 810 in the user interface 114 of the user device 113. Some examples of expanded menu options are shown in FIGS. 4, 6 and 7.

The document can be a collaborative document that is used and shared with other users. When another user initiates or opens the same document, a menu button and/or expanded menu options presented to the other user may be different from those presented to the user of the user device 113 and may be based on the predefined preferences of the other user and/or interactions of the other user with the document. The system can use an access control list associated with the document to determine which users are allowed to view the document and corresponding menu options.

Additional selections in the expanded menu options may be received at 812 by the user interface and processed by the productivity tool. For example, a selection for paintbrush drawing or an internet search may be received. When such selections are received, the option or functionality is presented to the user at 814. The options 814 presented to the user may be related to the selected menu. User programs and applications may also be selected in this manner and opened and executed with the document. If no selections are received, the menu will be hidden 808. When the menu is hidden, the productivity tool interface is presented as an uncluttered working canvas or piece of paper. In some scenarios, a smaller or shadow menu icon may be presented when the menu is hidden 808.

Figure 9:
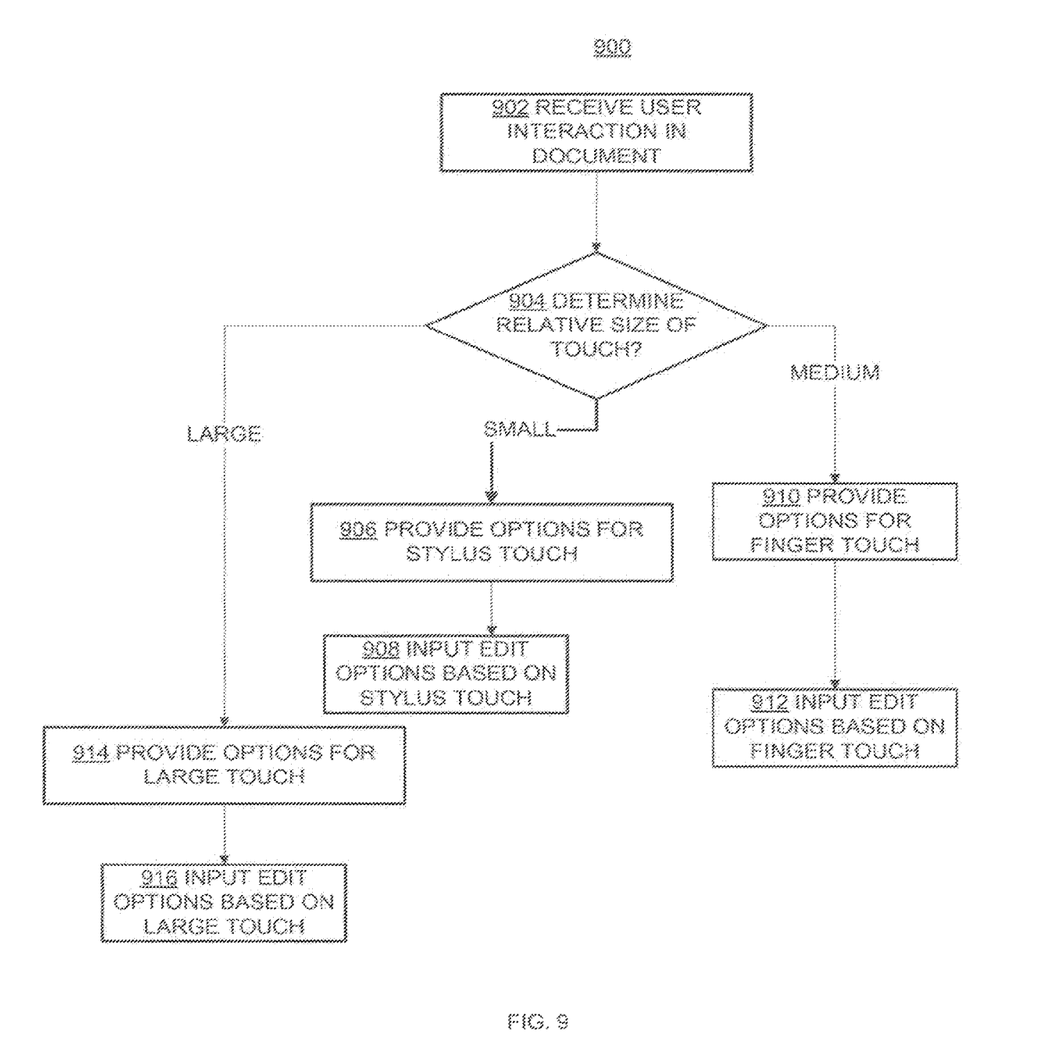
FIG. 9 is an exemplary flow chart of a method for presenting edit options, according to an illustrative embodiment.

The productivity tool may be used with a touchscreen which is capable of detecting relative size of a touch, and then presenting different editing options. In addition, the detection of different sizes of a touch may also yield different treatment in the blank canvas. FIG. 9 depicts a flow chart of a method 900 for presenting different options and entry of different edit options based on a sensed touch. In any location of the user interface and blank canvas of a user device 113, a user interaction may be received 902. The user interaction may be a sensed touch on the touchscreen of the user device 113. The sensed touch may be caused by the user touching the screen with a finger or part of a hand, or by use of a stylus. The touchscreen interface with detect the touch and determine a relative size of the touch 904. The touch may be detected by electronics in the glass of the touchscreen, details of which may be communicated to a processor 222 in the user device 113, or a remote processor in server 104. If the touch is determined to be small, for example, within the range of less than 2 mm, the processor 222 or server 104 may determine that the touch was caused using a stylus and the productivity tool will present options for stylus use 906. Additional user interactions may be received by the touchscreen that may be input as edit options based on a stylus touch 908. For example, a user interface may be presented to a user having suitable options for stylus entries in a canvas and stylus selections and entries may be entered in the canvas having a fine line like the stylus. If the stylus is used to select a large paint brush for drawing, however, the line may be input much larger than the size of the stylus.

For user interactions that are finger based, the processor 222 or server 104 may detect a medium size touch at 904 that is approximately in the range of 2 mm to 1.5 cm. When such sized touches are detected, the productivity tool will present options for a finger touch 910 and input subsequent user interactions based on a finger touch 912. For example, a finger sized touch may be detected and a menu options may be presented in the user interface that are suitable for finger sized selections. Free hand drawing or free hand writing or other content that is added to the canvas using a finger line will be input using a slightly larger sized line than a stylus line. However, if the user selected a fine drawing line, the line would be entered much smaller than the size of the user's finger.

In some uses, touches may be made to the touchscreen with two fingers or the side of the hand, such as a smearing or rubbing touch. Such touches will be larger than 1.5 cm and will be interpreted by the productivity tool at 904 as being large. In such cases, the productivity tool will present options for large touches or interactions 914 and input subsequent interaction based on a large touch 916. For example, a user may want to erase a section of a canvas and may scrub it out using the side of the user's hand or fist, similar to erasing a dry erase board or chalkboard. Such an interaction would be detected by the productivity tool and input accordingly. In some scenarios, the productivity tool may query the user if the user meant to erase an area before erasing the content. The user may also establish user settings in the productivity tool for handling and treating different user interactions. The options for stylus use, finger touches and larger sized touches may be the same or different.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method comprising:
   presenting a menu icon at a location on a touchscreen device;
   detecting, by a processor, a size of a touch related to the menu icon at the location on the touchscreen device;
   selecting, based on the size of the touch related to the menu icon, additional menu icons from a set of menu icons comprising different menu options, wherein the additional menu icons comprise a first menu icon to draw on a screen of the touchscreen device, and a second menu item to erase content from the screen of the touchscreen device;
   presenting, by the processor, the additional menu icons as a group adjacent to the location of the menu icon;
   detecting, by the processor, a touch of the first menu icon of the additional menu icons;
   presenting, adjacent to a location of the touched first menu icon, expanded menu options of the touched first menu icon, the expanded menu options comprising different brush types and different colors;
   performing a drawing function to draw an object corresponding to at least one of the expanded menu options on the screen of the touchscreen device;

detecting a touch of the second menu icon of the additional menu icons; and performing an erasing function to erase the drawn object from the screen of the touchscreen device.

2. The method of claim 1 further comprising:

hiding the menu icon before an interaction is sensed by the touchscreen device; and revealing the menu icon after an interaction is sensed by the touchscreen device.

3. The method of claim 1 wherein the expanded menu options further comprise different pen types and different pattern types.

4. The method of claim 1 wherein selecting the additional menu icons comprises selecting the additional menu icons based on a selection type of a user.

5. The method of claim 1 further comprising displaying a document on the touchscreen device, wherein the document is a collaborative document that is concurrently displayed on a second touchscreen device.

6. The method of claim 5 wherein the menu icon of the touchscreen device is different from a menu icon of the collaborative document on the second touchscreen device.

7. The method of claim 6 wherein the menu icon of the touchscreen device is based on an access control list for the document.

8. A system comprising:

a memory; and a processor, coupled to the memory, to:

provide for presentation a menu icon at a location on a touchscreen device;

detect a size of a touch related to the menu icon at the location on the touchscreen device;

select, based on the size of the touch related to the menu icon, additional menu icons from a set of menu icons comprising different menu options, wherein the additional menu icons comprise a first menu icon to draw on a screen of the touchscreen device, and a second menu item to erase content from the screen of the touchscreen device;

present the additional menu icons as a group adjacent to the location of the menu icon;

detect a touch of the first menu icon of the additional menu icons;

present, adjacent to a location of the touched first menu icon, expanded menu options of the touched first menu icon, the expanded menu options comprising different brush types and different colors;

perform a drawing function to draw an object corresponding to at least one of the expanded menu options on the screen of the touchscreen device;

detect a touch of the second menu icon of the additional menu icons; and perform an erasing function to erase the drawn object from the screen of the touchscreen device.

9. The system of claim 8 wherein the processor is further to:

hide the menu icon before an interaction is sensed by the touchscreen device; and reveal the menu icon after an interaction is sensed by the touchscreen device.

10. The system of claim 8 wherein the expanded menu options further comprise different pen types and different pattern types.

11. The system of claim 8 wherein the additional menu icons are further based on a selection type of a user.

12. The system of claim 8 wherein the processor is further to provide for display a collaborative document on the touchscreen device, the collaborative document being concurrently displayed on an additional touchscreen device.

13. The system of claim 12 wherein a menu icon presented on the additional touchscreen device is different from the menu icon presented on the touchscreen device.

14. The system of claim 12 wherein the menu icon of the touchscreen device is based on an access control list for the collaborative document.

15. A non-transitory computer readable storage medium comprising instructions that cause a processor to perform operations comprising:

presenting a menu icon at a location on a touchscreen device;

detecting, a size of a touch related to the menu icon at the location on the touchscreen device;

selecting, based on the size of the touch related to the menu icon, additional menu icons from a set of menu icons comprising different menu options, wherein the additional menu icons comprise a first menu icon to draw on a screen of the touchscreen device, and a second menu item to erase content from the screen of the touchscreen device;

presenting the additional menu icons as a group adjacent to the location of the menu icon;

detecting a touch of the first menu icon of the additional menu icons;

presenting, adjacent to a location of the touched first menu icon, expanded menu options of the touched first menu icon, the expanded menu options comprising different brush types and different colors;

performing a drawing function to draw an object corresponding to at least one of the expanded menu options on the screen of the touchscreen device;

detecting a touch of the second menu icon of the additional menu icons; and performing an erasing function to erase the drawn object from the screen of the touchscreen device.

16. The non-transitory computer readable storage medium of claim 15 wherein the expanded menu options further comprise different pen types and different pattern types.

17. The non-transitory computer readable storage medium of claim 15 wherein selecting the additional menu icons comprises selecting the additional menu icons based on a selection type of a user.

18. The non-transitory computer readable storage medium of claim 15 wherein the instructions further cause the processor to display a document on the touchscreen device, wherein the document is a collaborative document that is concurrently displayed on a second touchscreen device.

19. The non-transitory computer readable storage medium of claim 18 wherein the menu icon of the touchscreen device is different from a menu icon of the collaborative document on the second touchscreen device.

* * * * *